United States Patent
Aoki et al.

(10) Patent No.: US 12,328,337 B2
(45) Date of Patent: Jun. 10, 2025

(54) SYSTEM AND METHOD FOR PATTERN-BASED DETECTION AND MITIGATION OF ZERO-DAY VULNERABILITY EXPLOITATION

(71) Applicant: RAKUTEN MOBILE, INC., Tokyo (JP)

(72) Inventors: Sota Aoki, Tokyo (JP); Minkyung Shin, Tokyo (JP); Namrata Barpanda, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/920,978

(22) PCT Filed: Aug. 24, 2022

(86) PCT No.: PCT/US2022/041303
§ 371 (c)(1),
(2) Date: Oct. 24, 2022

(87) PCT Pub. No.: WO2024/043882
PCT Pub. Date: Feb. 29, 2024

(65) Prior Publication Data
US 2024/0223602 A1  Jul. 4, 2024

(51) Int. Cl.
*G06F 21/00* (2013.01)
*H04L 9/40* (2022.01)

(52) U.S. Cl.
CPC ...... *H04L 63/1466* (2013.01); *H04L 63/1433* (2013.01)

(58) Field of Classification Search
CPC ............. H04L 63/1466; H04L 63/1433; G06F 21/552
See application file for complete search history.

(56) References Cited

U.S. PATENT DOCUMENTS

| 2009/0241190 A1 | 9/2009 | Todd et al. |
| 2011/0231564 A1 | 9/2011 | Korsunsky et al. |

(Continued)

OTHER PUBLICATIONS

Menashe, "SpringShell (Spring4Shell) Zero-Day Vulnerability CVE-2022-22965 : All You Need To Know", https://jfrog.com/blog/springshell-zero-day-vulnerability-all-you-need-to-know/ (Year: 2022).*

(Continued)

*Primary Examiner* — Michael M Lee
(74) *Attorney, Agent, or Firm* — Sughrue Mion, PLLC

(57) ABSTRACT

A method implemented on an electronic device detects and mitigates software attacks exploiting a zero-day vulnerability, such as Spring4Shell, against a computer server. At least one initial identifier, which indicates an attempt to extract a predetermined type of information on the computer server, is detected within an activity log of the computer server to thereby indicate occurrence of an initial stage. Then, prior to elapsing of a search window having a predetermined time duration, at least one subsequent identifier, which indicates an attempt to perform remote code execution on the computer server, is detected within the activity log of the computer server. Then, a source of network activity associated with the detected identifiers is detected, and a security response associated with the identified source of network activity is performed to mitigate the exploitation of the vulnerability.

17 Claims, 3 Drawing Sheets

(56) References Cited

U.S. PATENT DOCUMENTS

| | | | |
|---|---|---|---|
| 2014/0380473 A1* | 12/2014 | Bu | G06F 21/566 |
| | | | 726/23 |
| 2016/0057166 A1* | 2/2016 | Chesla | H04L 63/1416 |
| | | | 726/22 |
| 2020/0145455 A1* | 5/2020 | Nandi | G06F 21/577 |
| 2021/0209232 A1 | 7/2021 | Shim et al. | |
| 2022/0255926 A1* | 8/2022 | Crabtree | H04L 63/1425 |

OTHER PUBLICATIONS

Simen Bai et al., "Efficiently Weaponizing Vulnerabilities and Automating Vulnerability Hunting", Bachelor's thesis, NTNU, May 2022 (178 pages total), Accessed via the Internet: https://ntnuopen.ntnu.no/ntnu-xmlui/bitstream/handle/11250/3004389/no.ntnu%3Ainspera%3A106258538%3A111750398.pdf?sequence=1.

International Search Report dated Dec. 15, 2022 issued by the International Searching Authority in Application No. PCT/US 22/41303.

Written Opinion dated Dec. 15, 2022 issued by the International Searching Authority in Application No. PCT/US 22/41303.

* cited by examiner

SYSTEM AND METHOD FOR PATTERN-BASED DETECTION AND MITIGATION OF ZERO-DAY VULNERABILITY EXPLOITATION

CROSS REFERENCE TO RELATED APPLICATIONS

This application is a National Stage of International Application No. PCT/US2022/041303 filed Aug. 24, 2022.

BACKGROUND

1. Field

Apparatuses and methods consistent with example embodiments relate to detection and mitigation of software attacks, and more particularly, to detection of hostile network activity indicating an impending exploitation of Spring4Shell or other zero-day vulnerability, on the basis of patterns of identifiers which have been determined based on evaluation of similar attacks.

2. Description of Related Art

Computer applications are frequently developed on an application framework platform: a system providing general, standardized application functionality in the form of code libraries, interfaces, and so forth, which can be used to assemble a complete application. For example, Spring is a popular open source Java-based framework developed and managed by VMWare®, Inc.

Application frameworks make it easier to develop applications, within the limits of the framework, by having many of the necessary features pre-programmed and ready to provide after simple configuration. They additionally supply common features—in particular, interface elements which, by being present in most or all applications developed through the framework, provide a more intuitive user experience to a user who is unfamiliar with a new application but has used other applications with the same elements.

The common aspects of these applications can also be a disadvantage, however, as bugs and security vulnerabilities in the command functions supplied by the framework can carry over to most or all applications developed using the framework. And because the developers of the applications did not themselves program the features which carry these issues, it may be impractical or impossible for them to correct the issues; they must instead rely on the framework developers to release a corrective update to the framework itself. When a vulnerability is a "zero-day" vulnerability, known to malicious actors but not yet known or only recently discovered by the framework developers, this corrective update may come well after the damage is done.

SUMMARY

It is an object of the disclosed system and method to accurately recognize hostile network activity indicating an impending software attack or attack in progress which exploits a software vulnerability.

It is another object of the disclosed system and method to prevent or mitigate attacks exploiting a zero-day vulnerability such as Spring4Shell without need for a corrective software patch to the zero-day vulnerability.

It is yet another object of the disclosed system and method to reduce the number of false positives in identifying an impending software attack or attack in progress without significantly increasing the number of false negatives.

It is still another object of the disclosed system and method to defend against Spring4Shell-style attacks on an application developed using the Spring framework.

In accordance with certain embodiments of the present disclosure, a method is provided for detection and mitigation of software attacks exploiting a zero-day vulnerability against a computer server. The method may include, by at least one processor, detecting an occurrence of an initial stage of an attack pattern definition by detecting at least one initial identifier associated with the initial stage within an activity log of the computer server. The at least one initial identifier may indicate an attempt to extract a predetermined type of information on the computer server. The method may further include, by the at least one processor, responsive to detection of the initial stage, commencing a search window having a predetermined time duration. The method may further include, by the at least one processor, detecting an occurrence of a subsequent stage of the attack pattern definition by detecting at least one subsequent identifier associated with the subsequent stage within the activity log of the computer server prior to an elapsing of the search window. The at least one subsequent identifier may indicate an attempt to perform remote code execution on the computer server. The method may further include, by the at least one processor, responsive to detection of the initial stage and the subsequent stage, identifying a source of network activity associated with the detected identifiers. The method may further include, by the at least one processor, performing a security response associated with the identified source of network activity to thereby mitigate exploitation of the zero-day vulnerability against the computer server.

In accordance with other embodiments of the present disclosure, a non-transitory computer-readable recording medium is provided having recorded thereon instructions executable by at least one processor to perform a method for detection and mitigation of software attacks exploiting a zero-day vulnerability against a computer server. The method may include detecting an occurrence of an initial stage of an attack pattern definition by detecting at least one initial identifier associated with the initial stage within an activity log of the computer server. The at least one initial identifier may indicate an attempt to extract a predetermined type of information on the computer server. The method may further include, responsive to detection of the initial stage, commencing a search window having a predetermined time duration. The method may further include detecting an occurrence of a subsequent stage of the attack pattern definition by detecting at least one subsequent identifier associated with the subsequent stage within the activity log of the computer server prior to an elapsing of the search window. The at least one subsequent identifier may indicate an attempt to perform remote code execution on the computer server. The method may further include, responsive to detection of the initial stage and the subsequent stage, identifying a source of network activity associated with the detected identifiers. The method may further include performing a security response associated with the identified source of network activity to thereby mitigate exploitation of the zero-day vulnerability against the computer server.

In accordance with still other embodiments of the present disclosure, an electronic device is provided for detection and mitigation of software attacks exploiting a zero-day vulnerability against a computer server. The electronic device may include at least one memory configured to store computer program code, and at least one processor configured to operate as instructed by the computer program code. The computer program code may include initial stage code configured to cause at least one of the at least one processor to detect an occurrence of an initial stage of an attack pattern definition by detecting at least one initial identifier associated with the initial stage within an activity log of the computer server. The at least one initial identifier may indicate an attempt to extract a predetermined type of information on the computer server. The computer program code may further include subsequent stage code configured to cause at least one of the at least one processor to, responsive to detection of the initial stage, commence a search window having a predetermined time duration, and detect an occurrence of a subsequent stage of the attack pattern definition by detecting at least one subsequent identifier associated with the subsequent stage within the activity log of the computer server prior to an elapsing of the search window. The at least one subsequent identifier may indicate an attempt to perform remote code execution on the computer server. The computer program code may further include response code configured to cause at least one of the at least one processor, responsive to detection of the initial stage and the subsequent stage, to identify a source of network activity associated with the detected identifiers, and perform a security response associated with the identified source of network activity to thereby mitigate exploitation of the zero-day vulnerability against the computer server.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
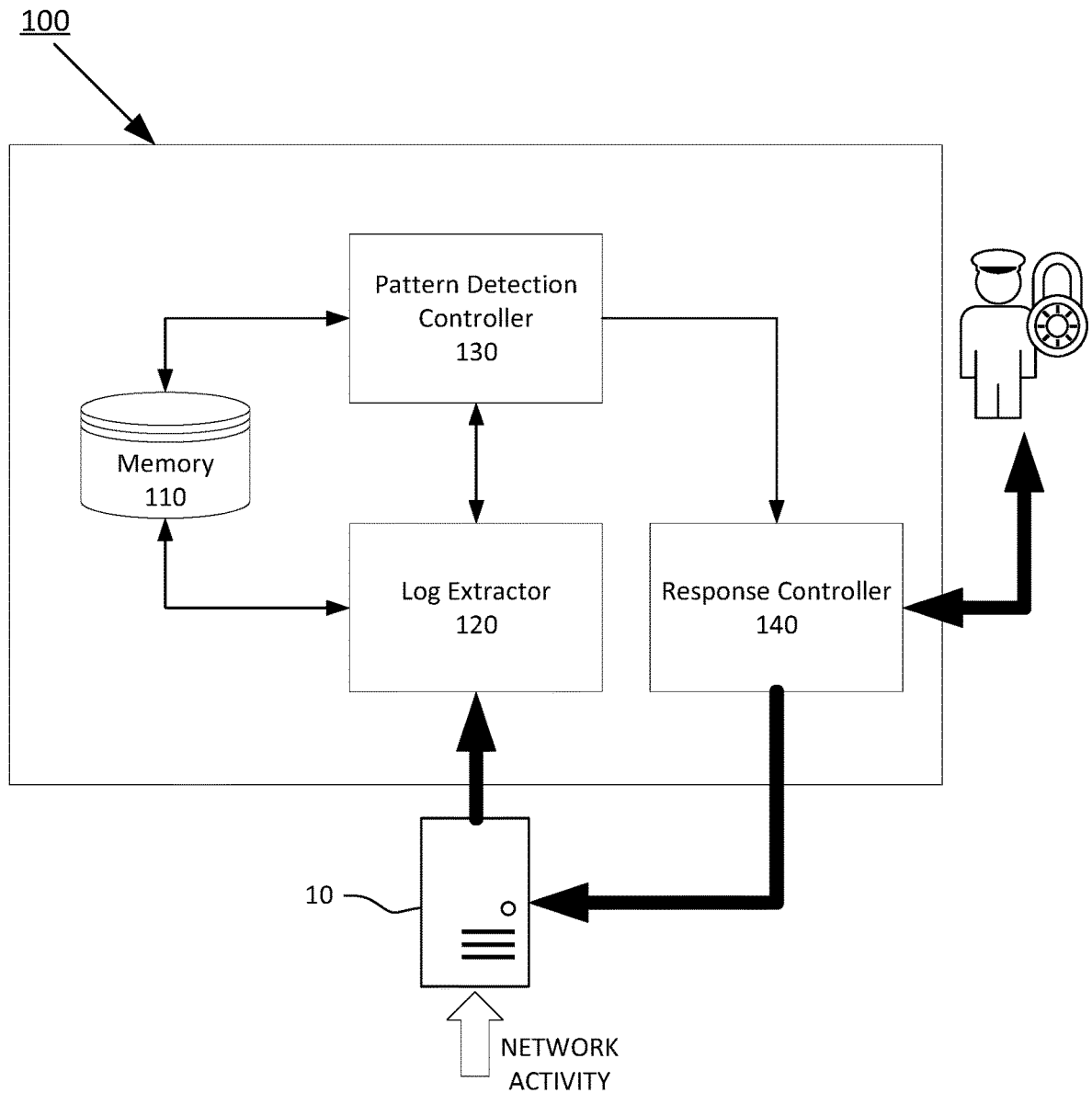
FIG. 1 is a block diagram illustrating a system for detection and mitigation of software attacks against a computer server, in accordance with an exemplary embodiment.

The following detailed description of example embodiments refers to the accompanying drawings. The same reference numbers in different drawings may identify the same or similar elements. The embodiments are described below in order to explain the disclosed system and method with reference to the figures illustratively shown in the drawings for certain exemplary embodiments for sample applications.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As described briefly in the Background, software developed through a framework platform, while advantaged in various ways, also carries the risk of experiencing software bugs and security vulnerabilities which originate with the framework platform and its functions. One example is the Spring4Shell vulnerability of the Spring framework, which permits remote code execution by web shell creation queries. The remote code execution can grant high level privileges for an application to an attacking party, who can then freely access the secure functions of the application. Whether a given Spring-based application is vulnerable to Spring4Shell attacks, and exactly what queries will be effective, is somewhat unpredictable and depends on the Spring features which have been enabled in the application. The Spring4Shell vulnerability has been officially patched, but applications developed in a pre-patch version of the framework remain vulnerable until they can be updated.

Additionally, Spring4Shell is itself a bypass of a patch which was deployed against a prior vulnerability. This demonstrates that another variant of the vulnerability may exist, still undetected by official parties, in the current or later versions of Spring. If discovered, such a variant will be another "zero-day vulnerability"-known to malicious actors but not yet patched—and therefore will leave applications vulnerable to security breaches, as the malicious actors (e.g., criminals and hackers) rush to exploit the vulnerability before a patch is deployed and implemented in all such applications.

Furthermore, due to its available features, Spring is often used to develop applications which make use of secure databases, and therefore even temporary vulnerabilities can produce serious and lasting damage in the form of data breaches.

Briefly, example embodiments of the present disclosure provide a method and system in which attempts to exploit a zero-day security vulnerability of a particular nature, such as Spring4Shell, are detected while in progress, such that a response can be executed to defend against the attack. Using this approach, the vulnerable software is defended without the need to wait for development and implementation of a patch.

It is noted before continuing that the principles disclosed herein are applicable to any software program developed on a framework platform and experiencing a zero-day security vulnerability originating from the framework platform—that is to say, any known vulnerabilities or variants thereof which are not yet patched in the framework platform or the software program itself. However, a software program developed on the Spring framework and carrying the Spring4Shell vulnerability, or a variant thereof, will be used as an exemplary application of these principles throughout the disclosure.

Embodiments of the disclosure more specifically detect network activity indicating preparation by a malicious actor for an impending attack, or indicating the early stages of attempting an attack, before the attack is completed successfully or is otherwise harmful. For convenience and brevity, such activity will be considered part of the attack for the purposes of this disclosure, and any description of "detection of an attack" will include detection of such activity while it is still in progress. As such, responses to "detection of an attack" include responses which prevent the attack from completing successfully or otherwise doing harm.

Detection of an attack is made possible by the disclosed system and method when particular characteristics or identifiers of the attack are known and form a pattern or scenario. In the context of an attack which exploits the Spring4Shell vulnerability, or a vulnerability which is similar to Spring4Shell, the pattern can be based on prior real or simulated attacks exploiting Spring4Shell.

The identifiers of the attack can be defined in terms of entries in server activity logs generated by the attack, using a regular expression or other search parameter. By using search parameters as definitions, the identifiers can be recognized in the logs through conventional automated searching processes.

Other approaches which use generic identifiers, especially without a specified pattern, can result in excessive false positives. This in turn wastes time, energy, and resources in investigating what turns out to be legitimate network activity. Embodiments of the present system and method therefore define identifiers of the attack, and especially the nature of the pattern, as specifically as possible.

In certain embodiments, a pattern of attack for exploiting the Spring4Shell vulnerability or similar vulnerability can be defined in part by a plurality of stages which occur in a particular sequence, and attack identifiers can be in part characterized by the stage of the attack in which they appear or are detectable. As such, certain identifiers will be described herein by their associated stage.

Once an attack is detected, a notification (e.g. a generated alert message) can be sent to a security administrator, communicating that a software attack is impending or in progress. Additionally, one or more security responses can be executed to halt or mitigate the attack. A security response can be executed manually by the security administrator. A security response can also, or alternatively, be executed automatically responsive to the detection of particular types of events, or the notifications resulting from the detection, without manual intervention.

Possible security responses can be analytical or defensive in nature. Analytical responses can include, but are not limited to: verification that the network activity is unexpected and/or undesired; review of network connection logs associated with a potentially targeted host system to identify a possible reverse shell; review of the file system of a potentially targeted host system for unknown executables or scripts, or other potentially malicious code; review of inbound and outbound network connections; and generating a report or alert identifying a source of potentially malicious activity. Defensive responses can include, but are not limited to: denying system access requests made by a source of potentially malicious activity; adding the source of potentially malicious activity to a blacklist; and disabling some or all network connections of the potentially targeted host system. It is noted that the information gathered from analytical responses can be used to enable selection of further appropriate security responses, themselves either analytical or defensive.

The source of potentially malicious activity can be identified from the activity log according to various attributes associated with the identifier entries. For example, an entry in the activity log may include an IP address, hostname, or username, which can be used to identify the source of the activity indicated by the entry.

A system for detection and mitigation of software attacks on the basis of an attack pattern definition, in accordance with an exemplary embodiment, will now be described with reference to FIG. 1.

A system 100, as illustrated in FIG. 1, is communicatively coupled to one or more servers 10 which execute software to be monitored, such as an application developed using the Spring framework. For convenience of depiction, only one server 10 is illustrated, but it will be understood that the system 100 can be coupled to any arbitrary number of servers. The system 100 and the servers 10 are coupled through any suitable network, which can include but is not limited to the Internet, a local wireless network, or a local wired network. The servers 10 each receive instructions and other network activity transactions from both the system 100 and from an arbitrary number of other devices (devices not depicted), and provide responses. The instructions are also stored by the servers 10 as entries in corresponding activity logs, which have a defined searchable format and which include a timestamp associated with each stored entry. Each stored entry may also include information about the source of an instruction, such as an IP address, hostname, or username.

The system 100 includes a memory 110, a log extractor 120, at least one pattern detection controller 130, and a response controller 140. In certain embodiments, the log extractor 120, pattern detection controller 130, and response controller 140 are software modules executing on a processor (not depicted) of the system 100.

The memory 110 stores data, which can have the format of a database or other data storage. The data on the memory 110 includes at least one attack pattern definition which can be retrieved for reference.

Each attack pattern definition includes a plurality of identifiers. Each identifier includes a search instruction for the activity logs of the servers 10; that is, the search instruction is in a form that can be used to search for content in the activity logs. For example, if the activity logs are formatted in plain text or similar, the search instruction can be a regular expression. Other formats of activity logs may require another suitable form of search instruction, which will be known to those implementing such an activity log. For convenience of description, when an entry in an activity log is located as a result of the execution of the search instruction of an identifier, this is described herein as "detecting the identifier within the activity log."

In certain embodiments, each attack pattern definition also includes a sequence of stages, which defines a plurality of stages in a specified order. Each stage has at least one identifier associated with it. In some attack pattern definitions, each identifier included in the attack pattern definition is associated with a single stage, but this is not a requirement, and other attack pattern definitions will include identifiers which are not associated with any stage, or are associated with multiple stages.

Certain stages can also have an associated time period, although this is not a requirement. Briefly, this time period can represent either a minimum or a maximum period, according to its configuration, between the previous stage in the sequence of stages and the present stage. Use of the time period will be described in more detail later herein.

Certain stages can also have defined conditions under which the stage is considered to have occurred. As an example, in certain embodiments, identifier groupings or "events" can be defined in the attack pattern definition, and more specifically in one of the stages of the attack pattern definition. Each event is associated with one or more identifiers. Each event also includes an indicator of how many of its associated identifiers must be detected for the event to be considered "occurring." For example, an event can indicate that it is occurring upon detection of one associated identifier, upon detection of all associated identifiers, or detection of any specified number of associated identifiers. The stage itself can also, in certain embodiments, have an indicator of how many of its associated events must be occurring for the stage itself to be considered occurring. As but one example, the conditions for a stage to occur can be if either of a first event and a second event have occurred, where the first event occurs if all five associated identifiers are detected, and the second event occurs if two of three associated identifiers are detected. It will be recognized that a variety of conditions based on events and identifiers are possible, and are within the scope of the disclosed system and method. It will also be recognized that logic other than the use of events may also be used to define conditions under which a stage has occurred.

The log extractor 120 is configured to request and receive the activity logs from the servers 10. Such requests are ongoing, such that the activity logs stored in the system 100 reflect recent activity on the servers 10. The log extractor 120 can store these activity logs in the memory 110, or can have its own dedicated storage.

The log extractor 120 also searches the activity logs at the direction of the pattern detection controller 130.

The pattern detection controller 130 is configured to receive an attack pattern definition from the memory 110. In some embodiments, a separate pattern detection controller 130 will exist for each attack pattern definition, and will conduct searches according to that attack pattern definition. In such embodiments, it may not be necessary to store the attack pattern definitions as data in memory 110; instead, each attack pattern definition can be coded into the software instructions of the corresponding pattern detection controller 130.

The pattern detection controller 130 is configured to control the log extractor 120 to search the activity logs, in accordance with the identifiers of the attack pattern definition and prior search results. The pattern detection controller 130 receives the results of each search, and determines from the search results whether the complete attack pattern definition has been detected. If so, the pattern detection controller 130 provides notification of detection of a software attack to the response controller 140. The notification can also include other information such as relevant contents of the activity logs.

More specifically, in certain embodiments, the pattern detection controller 130 controls the log extractor 120 to search in accordance with the identifiers associated with a first or initial stage of the sequence of stages of the attack pattern definition. The pattern detection controller 130 detects an occurrence of the first stage based on the search results and the indicators, events, or other logic which define combinations of identifiers required for the stage to occur. If the first stage occurs, the pattern detection controller 130 controls the log extractor 120 to search in accordance with the identifiers associated with a second stage of the sequence of stages of the attack pattern definition. This continues until all stages in the attack pattern definition have been detected, in the order of the sequence of stages.

If a stage has an associated time period, the pattern detection controller 130 controls the log extractor 120 to search in accordance with the stage only within entries having timestamps in accordance with the time period. The time period is considered to have commenced at the latest timestamp of the identifiers detected in the detection of the previous stage, and its conclusion may be determined accordingly. If the time period is a maximum time period, when all such entries have been searched and the conditions for the stage to occur have not been found, the pattern is determined to be incomplete, and the pattern detection controller 130 returns to the first or initial stage to start over. If the time period is a minimum time period, of if a stage does not have an associated time period, the pattern detection controller 130 controls the log extractor 120 to search in accordance with the stage indefinitely, until occurrence of the stage is detected.

The response controller 140 is configured to forward the notification from the pattern detection controller 130 to a security administrator, using a suitable interface, so that the administrator can evaluate the situation and respond appropriately.

The response controller 140 is also configured to execute a security response, which can take the form of instructions to the servers 10 or to other systems (not depicted). Various possible security responses have been described herein. A different security response can be executed depending on the specific attack pattern definition used during the detection and, by extension, the specific type of software attack detected.

In certain embodiments, one or more security responses execute automatically in response to the determinations of the pattern detection controller 130, for example, responsive to receipt of the notification from the pattern detection controller 130. In other embodiments, security responses are manually executed by the instructions of a security administrator provided through a suitable interface. The response controller 140 can also automatically provide a plurality of security responses for the security administrator to select from.

A general flow of processes for detection and mitigation of software attacks on the basis of an attack pattern definition, in accordance with an exemplary embodiment, will now be described with reference to FIG. 2.

Figure 2:
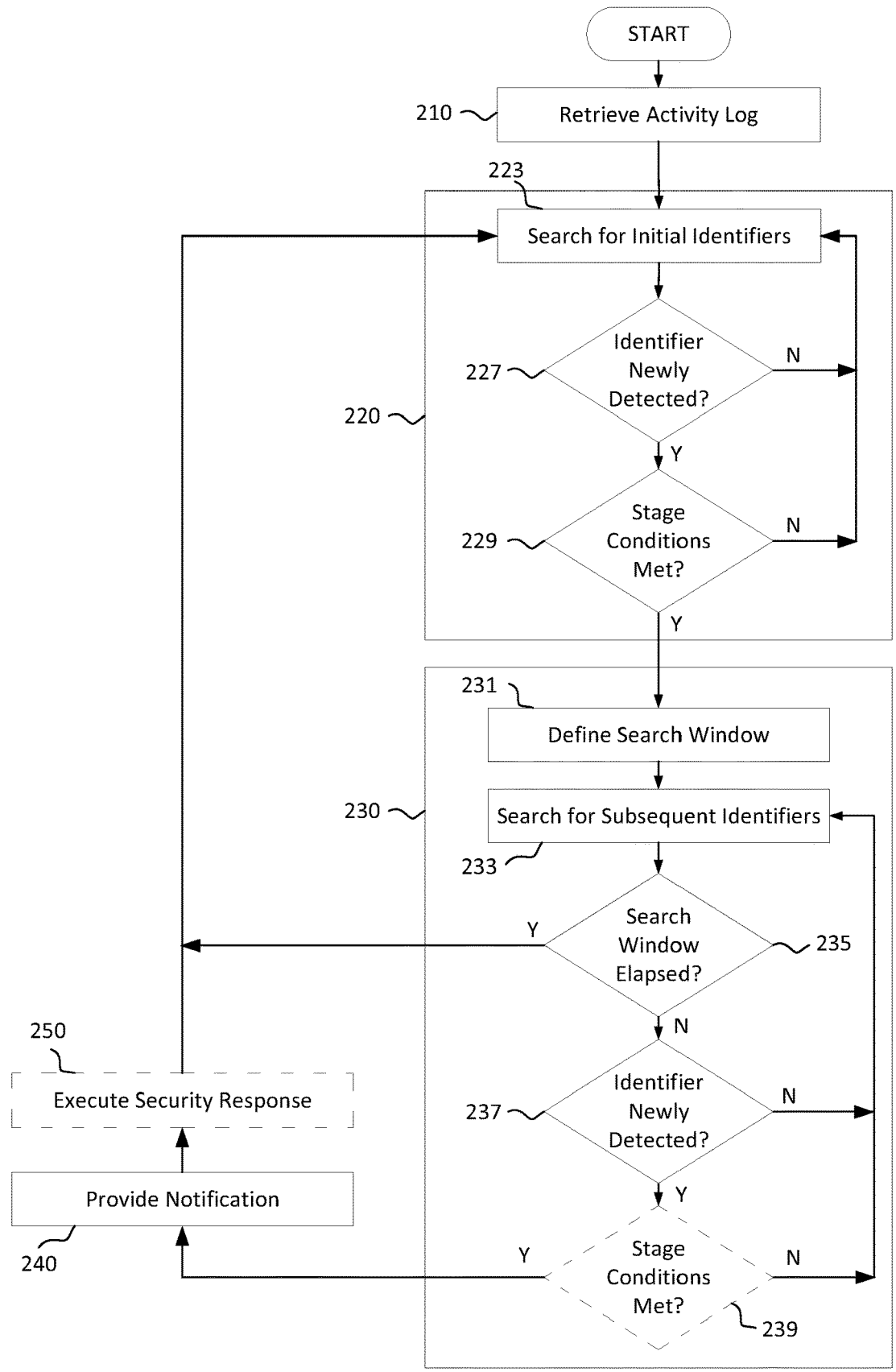
FIG. 2 is a flow diagram illustrating a flow of processes for detection and mitigation of software attacks against a computer server, in accordance with an exemplary embodiment.

The method of FIG. 2 more specifically operates according to an attack pattern definition having two stages, where an initial stage occurs upon detection of all identifiers associated with any one event defined by the initial stage, and a subsequent and final stage has a time period and occurs upon detection of any one identifier associated with the subsequent stage. It is noted that an attack pattern definition developed for the Spring4Shell is in accordance with such a method, as will be elaborated on further herein.

At 210, an activity log is retrieved for search. It is assumed that the retrieval of the log is ongoing; namely, that the log is being continuously or regularly updated in an ordered manner, such that the search can proceed through entries in the order the corresponding activity occurred.

At 220, an attempt to detect occurrence of an initial stage of an attack pattern definition is executed.

Specifically, at 223, a search begins through the activity log for any and all identifiers associated with the initial stage. These associated identifiers may be termed "initial identifiers" for convenience. The search of the activity log may be conducted according to an entry order by timestamp.

At 227, it is determined whether an initial identifier associated with the initial stage is newly detected—that is, detected for the first time—in the activity log. If it is determined that that an initial identifier is newly detected ("Yes" at 227), the workflow continues to 229. Otherwise ("No" at 227), the workflow returns to 223 to continue the search.

At 229, it is determined whether the conditions of the initial stage have been met according to the detected initial identifiers and the conditions of the initial stage. In the example depicted method, this operation involves determining for each event defined by the initial stage—termed "initial events" for convenience—whether all initial identifiers associated with that initial event have been detected. If it is determined that that this is the case for any of the initial events ("Yes" at 229), the workflow continues to 230. Otherwise ("No" at 229), the workflow returns to 223 to continue the search.

At 230, an attempt to detect occurrence of a subsequent stage of the attack pattern definition is executed.

Specifically, at 231, a search window is defined according to the time period for the subsequent stage, starting at the time of the timestamp of the last identifier detected for the initial stage and continuing to a time a length of the associated time period later.

At 233, a search begins through the activity log for any and all identifiers associated with the subsequent stage. These associated identifiers may be termed "subsequent identifiers" for convenience. The search of the activity log may be conducted according to an entry order by timestamp.

At 235, it is determined whether the search window has "elapsed" in the search. This is determined according to whether all entries that have timestamps within the search window have been searched. If it is determined that that the search window has not elapsed ("No" at 235), the workflow continues to 237. Otherwise ("Yes" at 235), the workflow returns to 223 and the search for identifiers of the initial stage starts over at the latest searched entry.

At 237, it is determined whether a subsequent identifier associated with the subsequent stage is newly detected—that is, detected for the first time—in the activity log. If it is determined that that a subsequent identifier is newly detected ("Yes" at 237), the workflow continues to 239. Otherwise ("No" at 237), the workflow returns to 233 to continue the search.

At 239, it is determined whether the conditions of the subsequent stage have been met according to the detected identifiers and the conditions of the subsequent stage. If it is determined that that this is the case ("Yes" at 239), the workflow continues to 240. Otherwise ("No" at 239), the workflow returns to 233 to continue the search. In the example depicted method, because identification of any one subsequent identifier is sufficient condition for detection of the subsequent stage, the workflow always continues to 240, making operation 239 effectively optional. The operation is nonetheless depicted to acknowledge the conditions of detecting the subsequent stage, which can be modified in variation embodiments of the depicted method.

An occurrence of each stage of the attack pattern definition, in order of the sequence of stages, has now been detected. Therefore, at 240, a notification of detection of a software attack is provided. Optionally, at 250, a pre-defined security response for the attack pattern definition is automatically executed, or manually executed by a security administrator upon further investigation of the network activity. The process then returns to 223 to detect the next attack.

Details of detection of a Spring4Shell vulnerability exploit or an exploit of a variant of the Spring4Shell vulnerability, will now be presented.

Evaluation of the nature of Spring4Shell attacks has distinguished several identifiers of their early and middle stages. Furthermore, these identifiers have been found to appear in particular combinations and with certain relative timing. By recognizing these identifiers and the pattern of their appearance, a Spring4Shell attack can be detected.

According to an embodiment, a pattern or scenario for detection of a Spring4Shell attack or variant thereof is as follows:

In a first or initial stage, one of two events appears. Either of these events indicates an attempt to extract certain types of information from the computer server, such as a password, username, or IP address, through exploitation of the Spring4Shell vulnerability or a related vulnerability. This information will be used in a later stage of the attack.

The first event, which will be termed Event A herein for convenience, can be defined as the appearance of five identifiers in combination, which will be termed Identifiers 1-5 herein for convenience. These identifiers will be described further herein. All of Identifiers 1-5 must be detected for Event A to be treated as occurring. The timing of these identifiers relative to each other is unimportant. It is also noted that two or more identifiers may be part of the same network request or instruction, and therefore will occur simultaneously; that is, will appear in the same entry of an activity log. Once all five of the five identifiers are detected, it is treated as detection of an occurrence of Event A.

The second event, which will be termed Event B herein for convenience, is defined as the appearance of a single identifier, which will be termed Identifier 6 herein for convenience. This identifier will be described further herein. Any detection of Identifier 6, in any context, is treated as detection of an occurrence of Event B.

If an occurrence of either Event A or Event B is detected, then the initial stage of the attack is treated as detected. An initial alert is in some embodiments sent responsive to detection of the initial stage. However, detection of the initial stage alone is not conclusive and may result in excessive false positives.

Therefore, the pattern also includes a second or subsequent stage. The second stage has a single associated event, which will be termed Event C herein for convenience. Event C indicates an attempt to perform remote code execution on the computer server, through exploitation of the Spring4Shell vulnerability or a related vulnerability, and uses the information collected as a result of Event A or B. Event C is defined as the appearance of any of three identifiers, which will be termed Identifiers 7-9 herein for convenience; these identifiers will be described further herein. Detection of any one of Identifiers 7-9 is treated as detection of an occurrence of Event C.

In the pattern of the present use case, the subsequent stage has a timing requirement: Event C must occur within a thirty-minute timespan which commences with the identified occurrence of the initial stage; that is, within thirty minutes of the detection of either Event A or Event B. This limitation operates under the assumption that a malicious actor would act on the opening provided by the initial stage of the attack within that thirty-minute period. If, after the thirty minutes elapses, occurrence of Event C and therefore of the subsequent stage has not been detected, the initial stage is treated as a likely false positive, or at least not urgent, and the system returns to its original state to search for identifiers of the initial stage once more. However, the detection of the individual identifiers, and/or the detection of Event A or B as a whole, can still be logged for later review, on a less urgent basis than if Event C had been also detected. It is also noted that detection of Event C independent of Event A and Event B can be part of a different attack pattern definition in certain configurations, with its own set of responses.

Collectively, the identifiers of Event A may indicate various fields defined in a malicious script intended for placement in a targeted system. For example, in an embodiment: Identifier 1 represents an instruction to set one of a predefined set of formatted layout elements of a program header, the set of elements being predefined according to a list or regular expression; Identifier 2 represents an instruction to append one of a predefined set of suffixes to the end of a file name, the set of suffixes being predefined according to a list or regular expression, and including the .jsp file extension or certain variations on .jsp; Identifier 3 represents an instruction to set a custom file path or directory path for creation of a file, rather than the default; Identifier 4 represents an instruction to append a prefix to the start of a file name; and Identifier 5 represents an instruction to set a custom timestamp. It is noted here that, as will be recognized by those of skill in the art, none of Identifiers 1-5 is, on its own, sufficiently suspicious or unusual activity for alarm. It is only in combination that these identifiers are of concern and are therefore treated as an occurrence of Event A.

In contrast, in an embodiment, Identifier 6—that is, Event B—represents an instruction to set one of a predefined set of formatted layout elements of a program header to particular values. The elements are predefined according to a regular expression, and the values are predetermined to correspond to particular elements. Identifier 6 is in itself suspect activity, and sufficient on its own to be treated as an occurrence of Event B.

While Identifiers 1-6 in the initial stage each represent initial requests to exploit the vulnerability by extracting information, Identifiers 7-9 in the subsequent stage each represent an attempt at performing remote code execution—specifically, execution of a remote webshell placed on the targeted system—which is enabled by the extracted information. Thus, any one of them, individually, indicates that a full attack is in progress and should be countered promptly before it can complete.

For example, in an embodiment: Identifier 7 represents an instruction defining a webshell which will execute any instruction given in the cmd parameter; Identifier 8 represents an instruction defining a payload to be executed; and Identifier 9 represents activity on existing webshells that includes one of a predefined set of suspect file names, the set being predefined according to a list or regular expression.

In testing, an implementation in accordance with the above disclosure was configured to generate an alert upon an occurrence of Event B, and again upon an occurrence of Event C. This implementation detected roughly four hundred instances of Event B, all of which were determined on further analysis to be the activity of a true malicious actor. Additionally, four instances of Event C were detected, all of which were determined on further analysis to be the activity of a true malicious actor.

These and related processes, and other necessary instructions, are preferably encoded as executable instructions on one or more non-transitory computer readable media, such as hard disc drives or optical discs, and executed using one or more computer processors, in concert with an operating system or other suitable measures.

In certain implementations, a system includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 3:
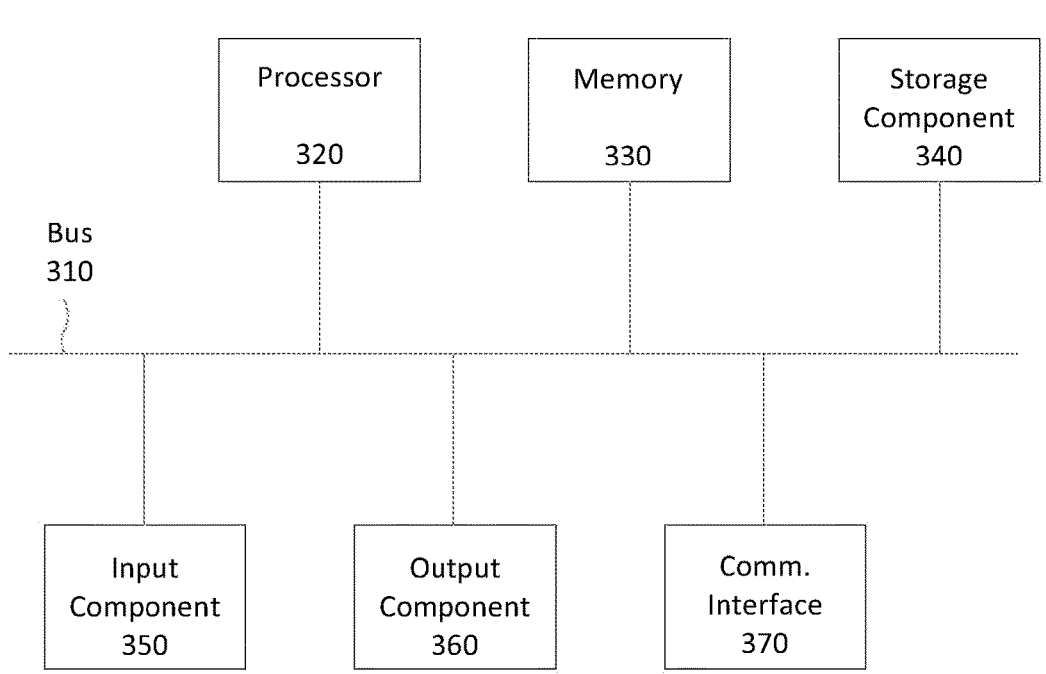
FIG. 3 is a diagram of example components of a device on which embodiments of the systems and/or methods described herein may be implemented.

FIG. 3 is a diagram of example components of a device 300. Device 300 may correspond to system 100 or server 10. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 may be implemented in hardware, firmware, or a combination of hardware and software. Processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the operations or processes of FIG. 2 may be implemented by or using any one of the elements illustrated in FIG. 3.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for detection and mitigation of software attacks exploiting a zero-day vulnerability against a computer server, the method comprising:
   by at least one processor, detecting an occurrence of an initial stage of an attack pattern definition by detecting at least one initial identifier associated with the initial stage within an activity log of the computer server, the at least one initial identifier indicating an attempt to extract a predetermined type of information on the computer server;
   by the at least one processor, responsive to the detection of the initial stage, commencing a search window having a predetermined time duration;
   by the at least one processor, detecting an occurrence of a subsequent stage of the attack pattern definition by detecting at least one subsequent identifier associated with the subsequent stage within the activity log of the computer server prior to an elapsing of the search window, the at least one subsequent identifier indicating an attempt to perform remote code execution on the computer server;
   by the at least one processor, responsive to the detection of the initial stage and the subsequent stage, identifying a source of network activity associated with the detected at least one initial identifier and at least one subsequent identifier; and
   by the at least one processor, performing a security response associated with the identified source of network activity to thereby mitigate exploitation of the zero-day vulnerability against the computer server.

2. The method of claim 1, wherein a plurality of subsequent identifiers are associated with the subsequent stage, the plurality of subsequent identifiers including:
   an identifier representing an instruction to define a webshell for executing instructions,
   an identifier representing an instruction to define a payload to be executed, and
   an identifier representing one of a predefined set of file names within webshell activity.

3. The method of claim 1,
   wherein a plurality of initial identifiers are associated with the initial stage,
   wherein the initial stage defines a plurality of initial events, at least one of the plurality of initial identifiers being associated with at least one of the plurality of initial events, and
   wherein detecting the occurrence of the initial stage includes detecting each initial identifier associated with at least one of the plurality of initial events within the activity log of the computer server.

4. The method of claim 3, wherein initial identifiers associated with a first initial event of the plurality of initial events include:
   an identifier representing an instruction to set one of a predefined set of layout elements of a program header,
   an identifier representing an instruction to append one of a predefined set of suffixes to a file name,
   an identifier representing an instruction to set a custom file path for a file creation,
   an identifier representing an instruction to append a prefix to a file name, and
   an identifier representing an instruction to set a custom timestamp.

5. The method of claim 4, wherein an initial identifier associated with a second initial event of the plurality of initial events represents an instruction to set one of a predefined set of layout elements of a program header to a corresponding predetermined value.

6. The method of claim 1, wherein the zero-day vulnerability is a Spring4Shell vulnerability.

7. The method of claim 1, wherein the source of network activity is identified by at least one of an IP address, hostname, or username.

8. The method of claim 1, wherein the predetermined type of information includes at least one of a password, username, or IP address.

9. A non-transitory computer-readable recording medium having recorded thereon instructions executable by at least one processor to perform a method for detection and mitigation of software attacks exploiting a zero-day vulnerability against a computer server, the method comprising:
   detecting an occurrence of an initial stage of an attack pattern definition by detecting at least one initial identifier associated with the initial stage within an activity log of the computer server, the at least one initial identifier indicating an attempt to extract a predetermined type of information on the computer server;
   responsive to the detection of the initial stage, commencing a search window having a predetermined time duration;
   detecting an occurrence of a subsequent stage of the attack pattern definition by detecting at least one subsequent identifier associated with the subsequent stage within the activity log of the computer server prior to an elapsing of the search window, the at least one subsequent identifier indicating an attempt to perform remote code execution on the computer server;
   responsive to the detection of the initial stage and the subsequent stage, identifying a source of network activity associated with the detected at least one initial identifier and at least one subsequent identifier; and
   performing a security response associated with the identified source of network activity to thereby mitigate exploitation of the zero-day vulnerability against the computer server.

10. An electronic device for detection and mitigation of software attacks exploiting a zero-day vulnerability against a computer server, the electronic device comprising:
   at least one memory configured to store computer program code;
   at least one processor configured to operate as instructed by the computer program code, the computer program code including:
      initial stage code configured to cause at least one of the at least one processor to detect an occurrence of an initial stage of an attack pattern definition by detecting at least one initial identifier associated with the initial stage within an activity log of the computer server, the at least one initial identifier indicating an attempt to extract a predetermined type of information on the computer server,
      subsequent stage code configured to cause at least one of the at least one processor to:
         responsive to the detection of the initial stage, commence a search window having a predetermined time duration, and
         detect an occurrence of a subsequent stage of the attack pattern definition by detecting at least one subsequent identifier associated with the subsequent stage within the activity log of the computer server prior to an elapsing of the search window, the at least one subsequent identifier indicating an attempt to perform remote code execution on the computer server, and
      response code configured to cause at least one of the at least one processor, responsive to the detection of the initial stage and the subsequent stage, to:
         identify a source of network activity associated with the detected at least one initial identifier and at least one subsequent identifier, and
         perform a security response associated with the identified source of network activity to thereby mitigate exploitation of the zero-day vulnerability against the computer server.

11. The electronic device of claim 10, wherein a plurality of subsequent identifiers are associated with the subsequent stage, the plurality of subsequent identifiers including:
   an identifier representing an instruction to define a webshell for executing instructions,
   an identifier representing an instruction to define a payload to be executed, and
   an identifier representing one of a predefined set of file names within webshell activity.

12. The electronic device of claim 10,
   wherein a plurality of initial identifiers are associated with the initial stage,
   wherein the initial stage defines a plurality of initial events, at least one of the plurality of initial identifiers being associated with at least one of the plurality of initial events, and
   wherein the initial stage code is configured to cause at least one of the at least one processor to detect the occurrence of the initial stage of the attack pattern definition by detecting of each initial identifier associated with at least one of the plurality of initial events within the activity log of the computer server.

13. The electronic device of claim 12, wherein initial identifiers associated with a first initial event of the plurality of initial events include:
   an identifier representing an instruction to set one of a predefined set of layout elements of a program header,
   an identifier representing an instruction to append one of a predefined set of suffixes to a file name,
   an identifier representing an instruction to set a custom file path for a file creation,
   an identifier representing an instruction to append a prefix to a file name, and
   an identifier representing an instruction to set a custom timestamp.

14. The electronic device of claim 13, wherein an initial identifier associated with a second initial event of the plurality of initial events represents an instruction to set one of a predefined set of layout elements of a program header to a corresponding predetermined value.

15. The electronic device of claim 10, wherein the zero-day vulnerability is a Spring4Shell vulnerability.

16. The electronic device of claim 10, wherein the response code is configured to cause at least one of the at least one processor to identify the source of network activity by at least one of an IP address, hostname, or username.

17. The electronic device of claim 10, wherein the predetermined type of information includes at least one of a password, username, or IP address.

* * * * *